United States Patent
Brunner et al.

(10) Patent No.: US 8,672,399 B2
(45) Date of Patent: Mar. 18, 2014

(54) VEHICLE SEAT HAVING AN ADJUSTABLE HEAD RESTRAINT

(75) Inventors: Stefan Brunner, Freising (DE); Markus Koidl, Munich (DE); Tobias Bokelmann, Groebenzell (DE)

(73) Assignee: Lear Corporation, Southfield, MI (US)

( * ) Notice: Subject to any disclaimer, the term of this patent is extended or adjusted under 35 U.S.C. 154(b) by 1201 days.

(21) Appl. No.: 12/054,604

(22) Filed: Mar. 25, 2008

(65) Prior Publication Data

US 2008/0284226 A1 Nov. 20, 2008

(30) Foreign Application Priority Data

May 15, 2007 (DE) .......................... 10 2007 022 623

(51) Int. Cl.
*A47C 1/036* (2006.01)

(52) U.S. Cl.
USPC .......................................................... 297/61

(58) Field of Classification Search
USPC .......................................................... 297/61
See application file for complete search history.

(56) References Cited

U.S. PATENT DOCUMENTS

| | | | |
|---|---|---|---|
| 4,600,240 A | 7/1986 | Suman et al. | |
| 5,229,694 A | 7/1993 | Takahara et al. | |
| 5,681,079 A | 10/1997 | Robinson | |
| 6,390,558 B2 * | 5/2002 | Fischer et al. | 297/61 |
| 6,767,064 B2 | 7/2004 | Veine et al. | |
| 6,817,646 B2 | 11/2004 | Kikuchi et al. | |
| 7,044,555 B2 | 5/2006 | Saberan | |
| 7,140,687 B2 * | 11/2006 | Hoekstra et al. | 297/61 X |
| 2005/0067874 A1 | 3/2005 | Kamrath et al. | |

FOREIGN PATENT DOCUMENTS

| | | |
|---|---|---|
| CN | 1323710 A | 11/2001 |
| DE | 10104386 A1 * | 7/2002 |
| DE | 10 2005 019 353 A1 | 4/2006 |
| DE | 10 2005 052 739 B3 | 3/2007 |

OTHER PUBLICATIONS

Office Action in corresponding Chinese Application No. 2008-10097230.9, Mar. 17, 2010, pp. 1-3.
Office Action in corresponding German Application No. 10 2007 022 623.5, Mar. 15, 2007, 4 pgs.
Machine Translation of DE 101 04 386 A1, published Jul. 25, 2002, Applicant: Volkswagen AG, pp. 1-5.

* cited by examiner

*Primary Examiner* — Anthony D Barfield
(74) *Attorney, Agent, or Firm* — Brooks Kushman P.C.

(57) ABSTRACT

A vehicle seat assembly for supporting an occupant having a seat bottom, a seat back connected to the seat bottom and a reclining mechanism configured to adjustably position the seat back relative to the seat bottom. A head restraint assembly adjustably connected to the seat back includes a headrest and one or more guides connected to and cooperating with the seat back to position the head restraint adjacent an occupant's head. A headrest adjustment mechanism for adjustably positioning the headrest relative to the seat bottom includes a locking member that releasably engages the one or more guides and a cable that cooperates with the release mechanism and the locking member to adjustably position the head restraint when the release mechanism is activated.

18 Claims, 4 Drawing Sheets

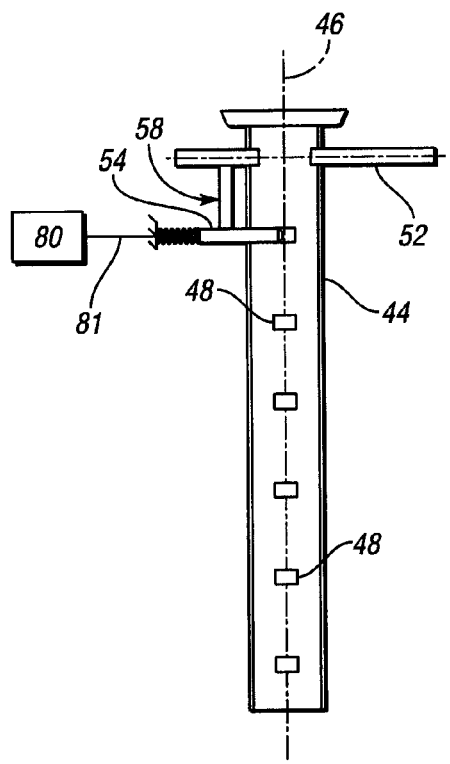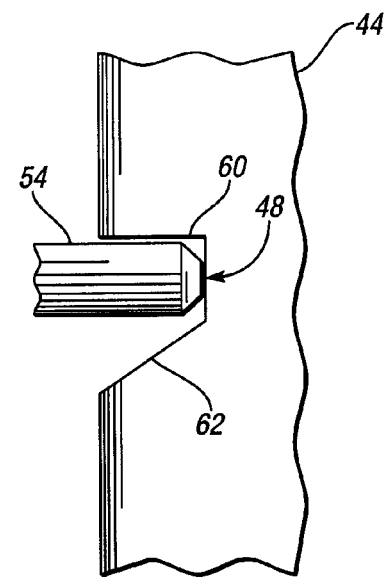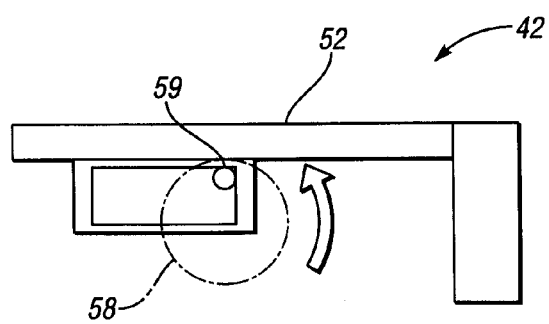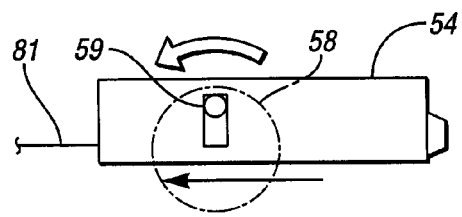
Fig. 4
Fig. 5
Fig. 6a
Fig. 6b

VEHICLE SEAT HAVING AN ADJUSTABLE HEAD RESTRAINT

CROSS-REFERENCE TO RELATED APPLICATIONS

This application claims priority to German Application No. 10 2007 022 623.5, filed on May 15, 2007, the disclosure of which is hereby incorporated in its entirety.

BACKGROUND OF THE INVENTION

1. Field of the Invention

The present invention generally relates to improvements in vehicle seat assemblies, and more particularly to a vehicle seat having an adjustable head restraint assembly.

2. Background Art

Seat assemblies are provided in the passenger seating area of a vehicle in a variety of configurations. For example, independent bucket seats may be mounted in various positions around the passenger seating compartment. Alternatively, bench seats that may accommodate more than one passenger can extend at least partially if not fully across the width of a passenger seating area.

Seat assemblies typically include a headrest or head restraint positioned adjacent an upper portion of a seat back. An adjustment mechanism may be provided to allow the headrest to be vertically adjustable relative to the seat back to provide head support for the seat occupant. The headrest assembly provides additional support to the occupant of the vehicle seat and, in the case of a vehicle collision, may provide support for the occupant's head and neck. Conventional headrest adjustment mechanisms can make adjustment of the height or position of the headrest assembly difficult based on the design of the passenger compartment or limitations of physical abilities of the vehicle occupants.

Many vehicles today also include seat assemblies that fold both forward and rearward to provide increased cargo area in the passenger compartment. One limitation of many of this seat design is the need to remove the head restraint prior to folding the seat. The headrest may be stowed generally away from the seat. If the headrest is stowed outside the vehicle, it may not be available when the seat is returned to its upright position.

Other headrests can remain attached to the seat assembly while being adjusted as the vehicle seat is folded. However, the headrest may interfere with an object directly in front of the headrest when repositioned, or it may interfere with the body of the vehicle. Thus, a vehicle occupant may not have the headrest available when it is needed.

While current seat assembly design parameters have proven satisfactory for many vehicles, a need exists to develop a vehicle seat having an adjustable head restraint assembly that can be selectively positioned adjacent the occupant's head. It is also desirable to provide an adjustable head restraint assembly which cooperates with the seat back recliner mechanism to adjust the headrest when the seat back is folded forward adjacent the seat bottom and returned to an operable position when the seat back is placed in a generally upright position.

SUMMARY OF THE INVENTION

The present invention provides a vehicle seat assembly having a seat bottom and a seat back connected to the seat bottom. A reclining mechanism is configured to adjustably position the seat back relative to the seat bottom. A head restraint assembly adjustably connected to the seat back includes a headrest and one or more guides connected to and cooperating with the seat back to position the head restraint adjacent an occupant's head. A headrest adjustment mechanism for adjustably positioning the headrest relative to the seat bottom includes a locking member that releasably engages the one or more guides and a cable that cooperates with the release mechanism and the locking member to adjustably position the head restraint when the release mechanism is activated.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 4 is a side plan view of the headrest adjustment mechanism arrangement and one or more headrest guides of the headrest assembly;

FIG. 5 is a side plan view of a locking member engaging a notch in the support shaft of the headrest guide;

FIGS. 6a and 6b are cross-sectional views of a linkage for use in connection with the headrest adjustment mechanism.

DETAILED DESCRIPTION OF THE PREFERRED EMBODIMENT(S)

Figure 1:
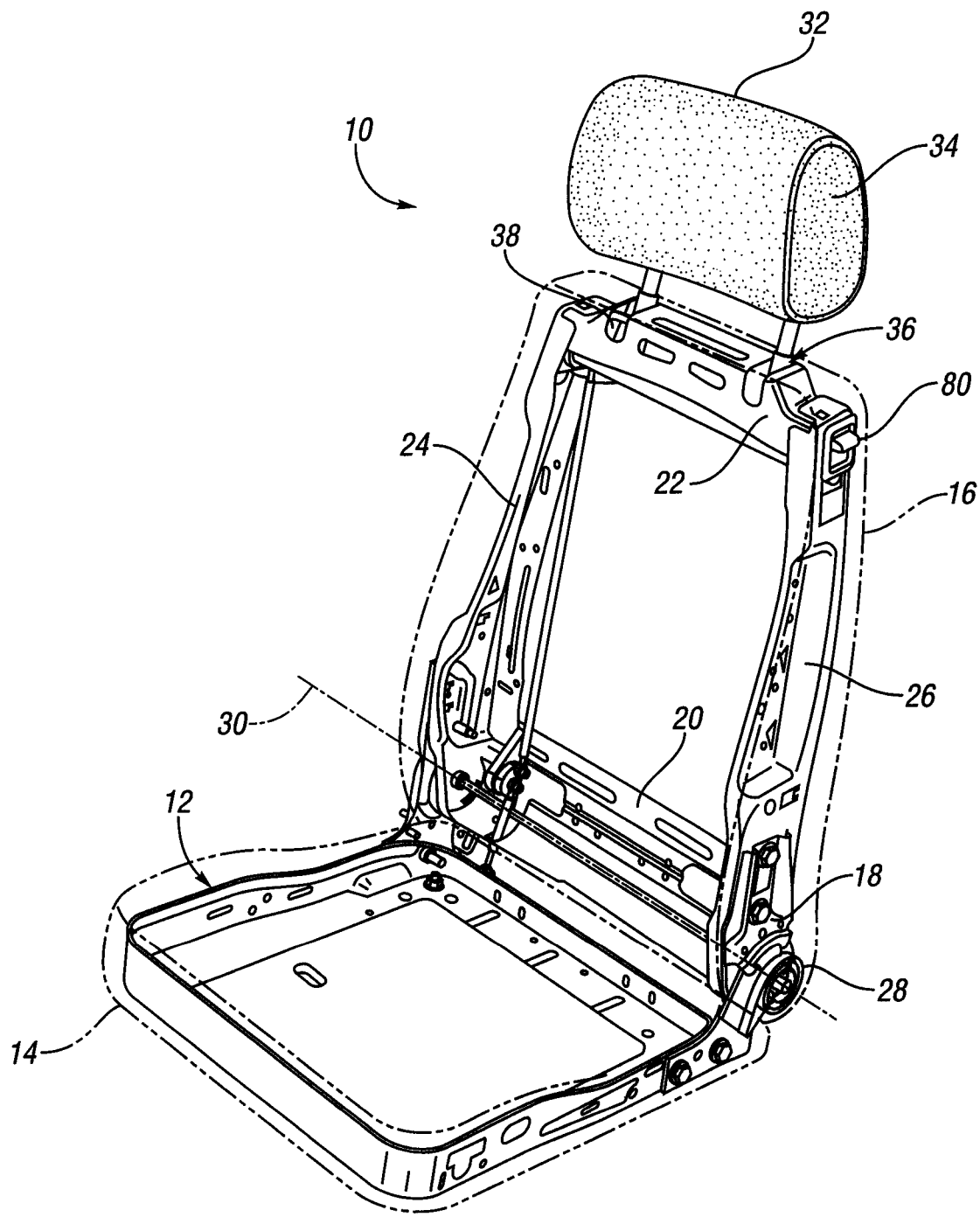
FIG. 1 is a perspective view of a seat assembly incorporating a seat back and head restraint assembly in accordance with the present invention.

Referring now to the Figures, a vehicle seat for use in the passenger seating area of a motor vehicle in accordance with the present invention is disclosed. It is understood that the seat may be used in any portion of the vehicle passenger seating areas.

In the following description, various operating parameters and components are described for a number of constructed embodiments. These specific parameters and components are included as examples and are not meant to be limiting. More specifically, directional language such as "left", "right", "above", "below", "upper", "lower" and words of similar import designate directions shown in the drawings. Such directional terminology is used for clarity and is not intended to strictly limit the orientation of any aspect of the invention to a particular plane or direction.

Referring now to the Figures, a seat assembly configured for use in a vehicle, such as an automobile, boat or aircraft is shown and disclosed. As shown in FIG. 1, a vehicle seat assembly 10 is illustrated having a frame 12 including a seat bottom 14 and a seat back 16. Seat back 16 may be adjustably connected to the seat bottom by a reclining mechanism 18.

Seat bottom 14 may be mounted directly to the vehicle floor or coupled to seat adjuster mechanisms or rails extending longitudinally to the vehicle floor enabling lateral and/or vertical movement of the seat bottom with respect to the vehicle floor.

Seat bottom 14 is conventional in design and can be constructed in accordance with any known manner, including a structural frame covered by a foam pad layer and outer finish cover material, or alternatively, with an elastomeric sock or sling. One or more manual or power adjustment mechanisms may also be provided to adjust the seat bottom or seat portions provided thereon to a number of positions. It is also understood that the seat may include one or more safety features including occupant restraint devices such as seatbelts.

Seat frame 12, including seat bottom 14 and seat back 16, is preferably formed from a lightweight material such as polycarbonate fiber or aluminum. However, it is understood that a variety of materials suitable for structural support of an occupant may also be used to create the seat frame. Seat back 16 includes a lower frame member 20, an upper frame member 22 and substantially vertical opposing side frame members 24, 26. Lower and upper frame members 20, 22 extend laterally to connect the opposing side frame members 24, 26. Frame members 20, 22, 24, 26 may be integrally formed or may be separate components that are joined in any suitable manner, such a by fasteners, adhesive or welding, to form seat back 16. Seat back 16 may have any suitable configuration.

Frame members 20, 22, 24, 26 cooperate with a seat back layer, such as an elastomeric sock or a structural frame covered by a pad layer and cover material, to support the occupant. Opposing side frame members 24, 26 are connected to seat bottom 12 by reclining mechanism 18. Reclining mechanism 18 extends laterally between the side frame members 24, 26 and cooperates with knob, handle or the like 28, allowing an occupant to adjust the vertical orientation of the seat back 16 about a pivot axis 30. It is understood that a switch-activated electromechanical reclining mechanism may be coupled to the seat assembly.

Seat back 16 includes an adjustably connected head restraint assembly 32. Head restraint assembly 32 is moveably associated with the seat back 14. More specifically, the head restraint assembly 32 is moveable between a first position and at least one second position. The head restraint assembly 32 includes a headrest or head restraint pad 34 and one or more supports or headrest guides 36 connected to the headrest 34 extending between the headrest and the upper frame member 22.

It is understood that headrest supports or guides 36 allow for vertical and angular rotation of the head restraint pad 34 mounted thereon. In the embodiment shown in the Figures, the headrest guides 36 have a generally cylindrical shaped configuration. However, it is understood that a variety of configurations may be used to accomplish the same functionality.

Figure 2:
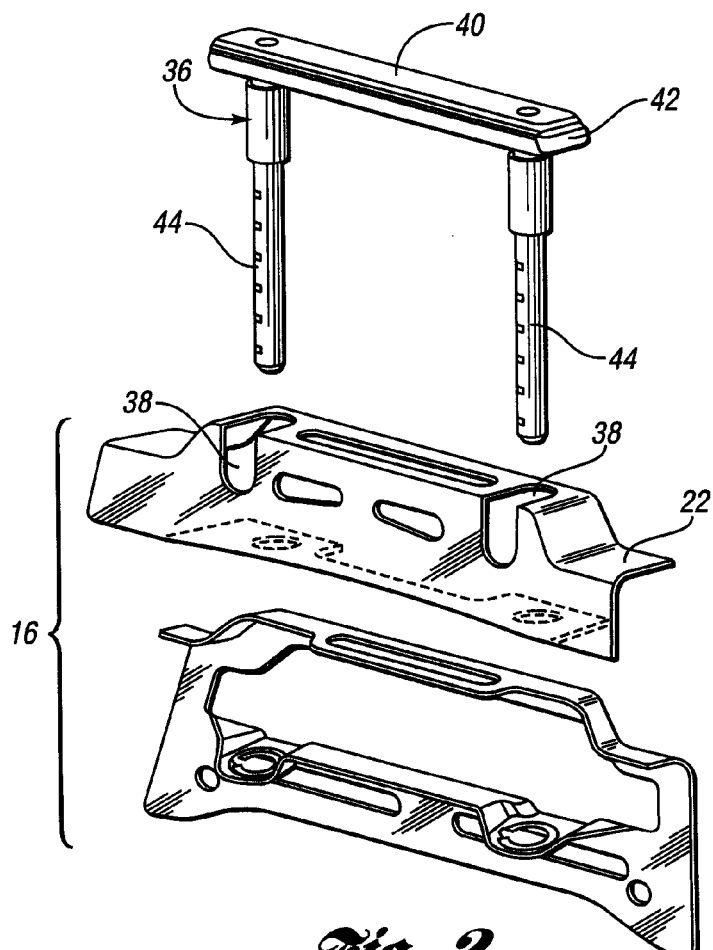
FIG. 2 is an exploded perspective view of the seat back and head restraint assembly.
Figure 3:
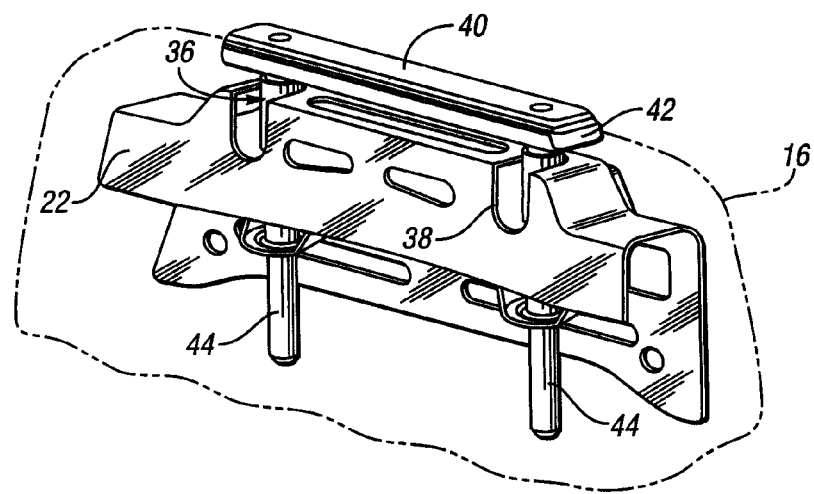
FIG. 3 is a perspective view of the seat back and head restraint assembly in accordance with the present invention.

Referring now to FIGS. 2-4, head restraint assembly 32 is described in greater detail. Assembly 32 includes a headrest adjustment mechanism generally referenced by number 42 cooperating with the one or more headrest guides 36 to facilitate movement of the headrest relative to the seat back. The one or more guides 36 may include a first end extending through slots or channels 38 provided in the upper frame member 22 of the seat back 16 and a second end connected to the headrest at member 40. It is contemplated that the one or more channels may be configured to allow the headrest 34 to move upward and/or forward to contact the head of an occupant or to allow the headrest to be adjusted between at least a stored position and a use position. Slots 38 may also be configured to provide limit stops for the one or more headrest guides 36 as the guides 36 move through slots 38.

Headrest adjustment mechanism 42 cooperates with and releasably connects to the one or more headrest guides 36 to position and allow adjustment of the headrest 34 relative to the seat back 16. It is contemplated that the headrest guide or support may include one or more support shafts and formed as a single shaft or, alternatively a shaft cooperating with a support structure extending through a cover to adjust the position of the headrest.

Shaft 44 may include one or more notches or receiving portions 48 formed on an outer surface that cooperate with and are releasably engaged by locking member 54 of the headrest adjustment mechanism 42. Notches 48 are disposed on the exterior surface of the shaft 44 at equally spaced apart intervals so that the notches will align the headrest into selectively desired positions. It is understood that a single notch on the shaft may provide the same functionality.

Referring now to FIGS. 4-5, a description of the adjustment of the headrest assembly 32 relative to the seat back 16 is described in greater detail. Headrest adjustment mechanism 42 may include a actuator 52 that slides perpendicular to the axis 46. Actuator 52 may cooperate with a locking member such that movement of the actuator 52 moves the locking member from a locked position to an unlocked position wherein the locking member disengages notch 48.

A locking member 54 engages notch 48 on the shaft 44 to inhibit movement of the headrest relative to the seat back. As shown in FIG. 6, notch 48 may include a locking surface 60 and a receiving surface 62. Receiving surface 62 may be formed with an angled face to allow the locking members to move from an exterior surface of the shaft toward an inner surface. Locking surface 60 may include a flat surface that cooperates with the angled receiving surface to receive and engage the locking member 54.

When locking member 54 disengages notch 48, headrest guide 36 may move relative to axis 46, allowing the headrest to be adjusted. The actuator 52 of the headrest adjustment mechanism 42 may be manually actuated by an occupant applying force against the end of the actuator 52.

In another aspect of the invention illustrated in FIGS. 6a and 6b, a passenger may actuate headrest adjustment mechanism 42 such that the headrest will move downward to a stored position without actuation of the release mechanism. A transfer member 58 extends between actuator 52 and locking member 54 to translate actuation of actuator 52 by a passenger to the locking member 54. Pin 59 of transfer member 58 rotates from an engaged position to a disengaged position upon actuation of the actuator 52.

In yet another aspect of the invention, it is contemplated that a cable, such as a Bowden cable, represented by line and reference number 81, may extend between headrest guide 36 and the release mechanism 80 coupled to the seat back. Thus, when the release mechanism 80 is operated, the cable is drawn and moves locking member 54. In this arrangement, the cable 81 may be configured to move locking member 54 from an engaged position wherein locking member 54 is at least partially received in notch 48 to an disengaged position to allow the guides 36 to move the headrest toward the seat back when the seat back is folded toward the seat bottom described in greater detail below.

Figure 7:
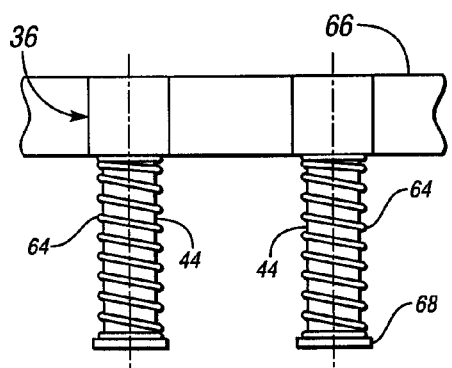
FIG. 7 is a sectional view of one aspect of a component of the headrest adjustment mechanism used with the headrest assembly.

FIG. 7 illustrates a coupling mechanism having a tension member or spring 64 disposed around the one or more support shafts 44. In the aspect illustrated in FIG. 7, a tension member 64 is provided around each of a pair of support shafts 44. Tension member 64 extends between the headrest frame 68 and an upper portion of seat back, such as the seat back frame

Figure 8:
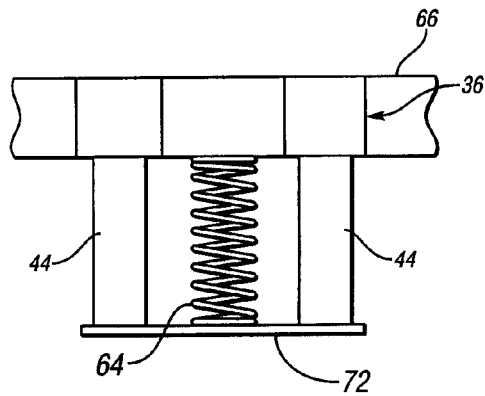
FIG. 8 is a sectional view of another aspect of a component of the headrest adjustment mechanism used with the headrest assembly.

66. FIG. 8 illustrates a single tension member 64 is disposed between a pair of support shafts 44. It is understood that the single tension member may be disposed in any position between the seat back frame and upper seat back. A mounting member 72 extends between support shafts 44 and engages a lower end of the compression member to support and cooperate in the tension and compression of the spring 64. Tension members 64 cooperate to adjust the headrest relative to the seat back as will be described more fully below.

Referring now to FIGS. 4-5 and 9-10, a description of the positioning of the headrest relative to seat back is described in greater detail. As shown in FIG. 4, headrest guide 36 may be engaged by locking member that is actuated by headrest adjustment mechanism 42 and/or cable 81 connected to release mechanism 80.

Figure 9:
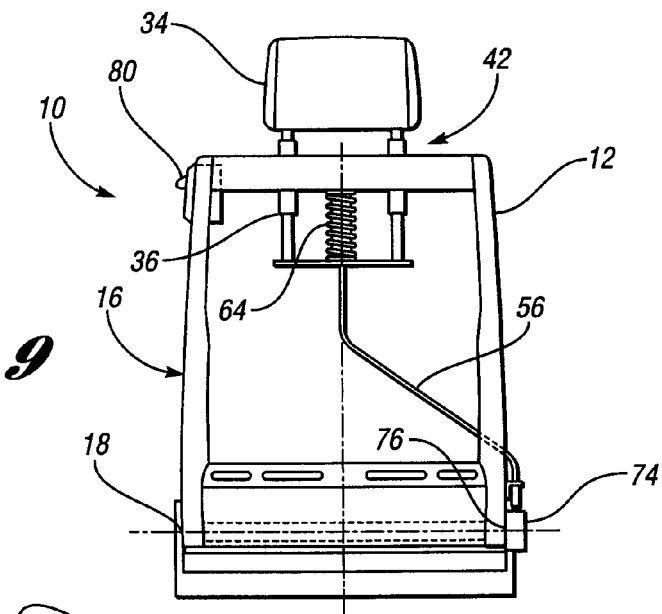
FIG. 9 is a rear plan view of a vehicle seat with the seat back and headrest positioned in a use position.
Figure 10:
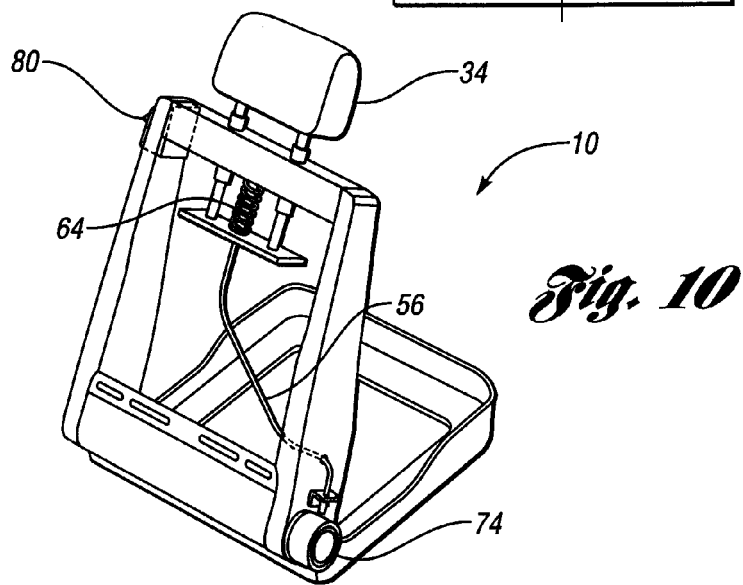
FIG. 10 is a perspective view of a vehicle seat with the seat back and headrest positioned in a stored position.

FIG. 9 illustrates seat assembly 10 with seat back 16 and headrest 34 in a use position. In one aspect of the present invention, reclining mechanism 18 is actuated to move the seat back 16 from a use position shown in FIG. 9 to a stored position in FIG. 10. Headrest adjustment mechanism 42 may include a drum 74 is rotatably connected to the seat frame 12 that cooperates with reclining mechanism 18 through a gear box 76.

Actuation of the reclining mechanism 18 by rotation, translation or other movement is transferred to the gear box 76, which in turn rotates drum 74. Gear box 76 may be configured to maximize the movement of the reclining mechanism 18 through optimizing gear ratios used in the gear box. As drum 74 rotates, cable 56 is pulled and gathered around the drum 74. The movement of the cable 56 around the drum 74 causes the cable to pull the mounting member 72 together with the headrest guide 36 and thereby, the headrest 34, to travel downward to a stored position. The headrest is moved up again by the force of the spring 64.

Extension of the headrest assembly relative to the upper portion of the seat back are based on tolerance limits typically defined by design choices. For example, in one aspect of the present invention, the support shafts are designed to allow a travel length of about 200 millimeters to accommodate a wide range of occupant heights. However, it is understood that the present invention may be used with a wide range of seating configurations and accept tolerances exceeding or limiting the preferred range.

It is also contemplated that the reclining mechanism 18 can be actuated to return the seat back 16, and thereby, the headrest 34 to a use position. Actuation of the reclining mechanism 18 causes gear box 76 to rotate drum 74 in the opposite direction, thereby allowing cable 56 to pull away from the drum 74. As the cable extends from the drum 74, the mounting member 72 can move upward. Tension members 64 shown in FIGS. 7 and 8 force headrest guides 36 to extend upward, allowing the headrest 34 to extend upward from the seat back 16. Locking member 54 engages the notch 48 when the headrest guide 36 rises to the desired height with the assistance of tension member 64.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly for supporting an occupant, the assembly comprising:
    a seat bottom;
    a seat back connected to the seat bottom having a frame including an upper frame member;
    a reclining mechanism configured to adjustably position the seat back relative to the seat bottom;
    a release mechanism configured to releasably lock the reclining mechanism in at least one locked and unlocked position, the release mechanism including a locking member and a cable; and
    a head restraint assembly adjustably connected to the seat back, the head restraint assembly including a headrest, one or more guides connected to and cooperating with the headrest and the seat back, at least one of the one or more guides including a plurality of notches formed on the guide to position the headrest adjacent an occupant's head and for adjusting the position of the headrest relative to the seat back,
    wherein when the reclining mechanism is in an locked position, the locking member is engaged with at least one of the of notches, and when the release mechanism is actuated, the cable cooperates with the locking member so that the locking member is disengaged with the notch, the reclining mechanism is thereby unlocked such that the seat back may be positioned relative to the seat bottom, and the head restraint may be adjusted relative to the seat bottom.

2. The vehicle seat assembly of claim 1 wherein the one or more guides further comprise a pair of opposing support shafts extending between and operably connected to the seat back frame and headrest.

3. The vehicle seat assembly of claim 2 wherein the plurality of notches are disposed on an exterior surface of the shaft at equally spaced intervals to provide headrest mounting positions.

4. The vehicle seat assembly of claim 1 wherein the headrest adjustment mechanism further comprises one or more tension members extending between the headrest and the seat back to control the movement of the headrest relative to the seat back.

5. The vehicle seat assembly of claim 1 wherein the headrest adjustment mechanism further comprises a drum configured to receive the cable and a gear box operatively connected to the drum and release mechanism such that actuation of the release mechanism is transferred to the cable through the gear box and drum.

6. The vehicle seat assembly of claim 1 wherein the release mechanism further includes a pin that may disengage the locking member from the notches so that the head restraint assembly may be adjusted relative to the seat back without actuating the reclining mechanism.

7. The vehicle seat assembly of claim 1 wherein the release mechanism is disposed on an upper portion of the seat back adjacent the headrest.

8. A seat back and head restraint assembly configured for use with a vehicle seat having a seat bottom, the assembly comprising:
    a seat back connected to the seat bottom having a frame including an upper frame member;
    a reclining mechanism configured to adjustably position the seat back relative to the seat bottom;
    a release mechanism configured to releasably lock the reclining mechanism in at least one locked and unlocked position, the release mechanism including a locking member and a cable; and a head restraint assembly adjustably connected to the seat back, the head restraint assembly including a headrest, one or more guides connected to and cooperating with the headrest and the seat back, at least one of the one or more guides including a plurality of notches formed on the guide to position the headrest adjacent an occupant's head and for adjusting the position of the headrest relative to the seat back, wherein when the reclining mechanism is in an locked position, the locking member is engaged with at least one of the notches, and when the release mechanism is actuated, the cable cooperates with the locking member so that the locking member is disengaged with the notch, the reclining mechanism is thereby unlocked such that the seat back may be positioned relative to the seat bottom, and the head restraint may be adjusted relative to the seat bottom.

9. The assembly of claim 8 wherein the one or more guides further comprise a pair of opposing support shafts extending between and operably connected to the seat back frame and headrest.

10. The assembly of claim 9 wherein the plurality of notches are disposed on an exterior surface of the shaft at equally spaced intervals to provide headrest mounting positions.

11. The assembly of claim 8 wherein the headrest adjustment mechanism further comprises one or more tension members extending between the headrest and the seat back to control the movement of the headrest relative to the seat back.

12. The assembly of claim 8 wherein the headrest adjustment mechanism further comprises a drum configured to receive the cable and a gear box operatively connected to the drum and release mechanism such that actuation of the release mechanism is transferred to the cable through the gear box and drum.

13. The assembly of claim 8 wherein the release mechanism further includes a pin that may disengage the locking member from the notches so that the head restraint assembly may be adjusted relative to the seat back without actuating the reclining mechanism.

14. The assembly of claim 8 wherein the release mechanism is disposed on an upper portion of the seat back adjacent the headrest.

15. A seat back and head restraint assembly configured for use with a vehicle seat having a seat bottom, the assembly comprising:
  a seat back connected to the seat bottom having a frame including an upper frame member;
  a release mechanism configured to adjustably position the seat back relative to the seat bottom in at least one locked and unlocked position; and
  a head restraint assembly adjustably connected to the seat back, the head restraint assembly including a headrest, one or more guides connected to and cooperating with the headrest and the seat back, at least one of the one or more guides including a plurality of notches formed on the guide to position the headrest adjacent an occupant's head and one or more tension members extending between the headrest and the seat back to control the movement of the headrest relative to the seat back;
  a headrest adjustment mechanism for adjusting the position of the headrest relative to the seat back having a locking member that releasably engages the one or more guides and a cable that cooperates with the release mechanism and the locking member to adjustably position the head restraint when the release mechanism is actuated to position the seat back adjacent the seat bottom,
  wherein when the seat back is in an locked position, the locking member is engaged with at least one of the notches, and when the release member is actuated, the cable cooperates with the locking member so that the locking member is disengaged with the notch, the seat back is thereby unlocked such that the seat back may be positioned relative to the seat bottom, and the locking member engages one or more notches on the one or more guides to secure the headrest adjacent the seat back.

16. The assembly of claim 15 wherein the adjustment mechanism further comprises a drum configured to receive the cable and a gear box operatively connected to the drum and release mechanism such that actuation of the release mechanism is transferred to the cable through the gear box and drum.

17. The assembly of claim 15 wherein the release mechanism further includes a pin that may disengage the locking member from the notches so that the head restraint assembly may be adjusted relative to the seat back without unlocking the seat back.

18. The assembly of claim 15 wherein the release mechanism is disposed on an upper portion of the seat back adjacent the headrest.

* * * * *